Dec. 1, 1942.　　　　A. B. NEWTON　　　　2,303,654
CONTROL APPARATUS
Filed July 12, 1940
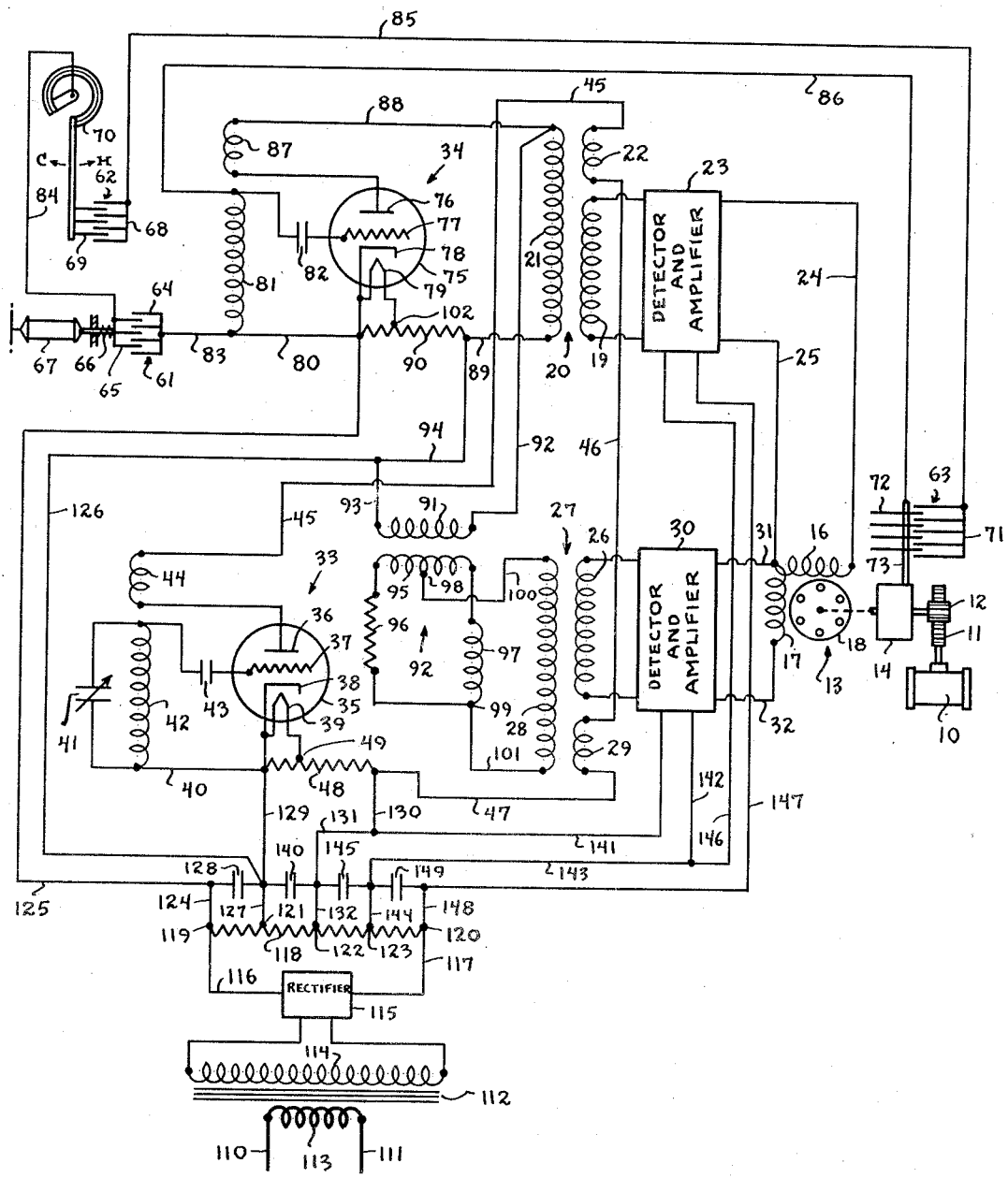
INVENTOR
Alwin B. Newton
BY George H Fisher
ATTORNEY Patented Dec. 1, 1942

2,303,654

UNITED STATES PATENT OFFICE 2,303,654

CONTROL APPARATUS

Alwin B. Newton, Minneapolis, Minn., assignor to Minneapolis-Honeywell Regulator Company, Minneapolis, Minn., a corporation of Delaware Application July 12, 1940, Serial No. 345,251

12 Claims. (Cl. 236—44)

This invention relates to control apparatus wherein condition responsive devices are used to modulate a high frequency current.

An object of this invention is to provide an improved control system including a frequency responsive control device and means to vary the frequency of the current supplied to the control device in accordance with the magnitude of a condition.

A further object is to provide an improved control system including a control device selectively operable in either of two directions, and means responsive to the direction of departure of a condition from a predetermined value to determine the direction of operation of said control device.

A further object is to provide an improved control system including a control device variable in speed and selectively operable in either of two directions, and means responsive to the direction of departure of a condition from a predetermined value to determine the direction of operation of said control device, and responsive to the magnitude of such departure to regulate the speed of said control device.

A further object of the invention is to provide an improved control system of the type described which shall be extremely sensitive to small changes in the controlling condition.

I accomplish the objects set forth by operating the control device of my system with a split phase motor which is variable in speed in accordance with the frequency of the current supplied to its terminals, and variable in direction of rotation in accordance with the phase relations of said current. This motor is supplied with energy obtained by heterodyning the outputs of two oscillators. One oscillator is set to produce a standard frequency, while the frequency of the other oscillator is varied in accordance with the magnitude of the controlling condition. The beat frequency, and therefore the motor speed is determined by the magnitude of the departure of the controlling condition from a datum determined by the standard frequency.

It is a well known fact that the beat wave produced by combining a wave of certain standard frequency with another wave of frequency, for example, 200 cycles lower than the standard, is displaced in phase 180° from the beat wave produced by combining a wave of the same standard frequency with another 200 cycles higher than the standard. This phenomenon is utilized in my invention to determine the direction of rotation of the motor which drives the control device.

Other objects of the invention will be apparent from the accompanying specification, claims, and drawing, which is a wiring diagram of a control system embodying my invention.

In the drawing, 10 represents a valve operated by a rack 11 and cooperating pinion 12 which is driven by a motor generally indicated at 13 through a reduction gear shown diagrammatically at 14. Motor 13 is of the split phase type having field windings 16 and 17 and a rotor 18. Each of the windings 16 and 17 is supplied with current from a separate source. The speed of the motor depends upon the frequency of the current supplied to the windings and the direction of rotation depends upon the phase relations between the currents flowing in the two windings. That is to say, if the current in winding 16 leads the current in winding 17 the motor will rotate in one direction, for instance clockwise, while if the current for winding 17 leads the current in winding 16 the motor will rotate in the opposite direction, or counter-clockwise.

The energization of winding 16 is controlled in accordance with the current flow in a secondary winding 19 of an air core transformer generally indicated at 20. The air core transformer 20 is also provided with two primary windings 21 and 22. The secondary winding 19 is connected to the input terminals of a detector and amplifier circuit schematically shown at 23. The output terminals of the detector and amplifier 23 are connected through conductors 24 and 25 to the winding 16.

The energization of winding 17 is similarly controlled in accordance with the current flow in a secondary winding 26 of an air core transformer generally indicated at 27. The transformer 27 is also provided with two primary windings 28 and 29. The secondary winding 26 is connected to the input terminals of a detector and amplifier schematically indicated at 30. The output terminals of the detector and amplifier 30 are connected through conductors 31 and 32 to the motor winding 17.

An oscillator circuit indicated generally at 33 serves to supply high frequency current to the primary windings 22 and 29 of transformers 20 and 27, respectively. A second oscillator circuit generally indicated at 34 supplies current to the primary windings 21 and 28 of transformers 20 and 27, respectively.

The oscillator circuit 33 comprises an electric discharge device 35 of any suitable type, being shown as a triode comprising an anode 36, a control electrode 37, a cathode 38, and a heater filament 39. The input circuit of the triode 35 may be traced from cathode 38 through a conductor 40, a variable condenser 41 in parallel with an inductance 42 and a coupling condenser 43 to the control electrode 37. The output circuit of the triode 35 may be traced from anode 36 through an inductance 44, a conductor 45, primary winding 22 of transformer 20, a conductor 46, primary winding 29 of transformer 27, a conductor 47, and a voltage dividing resistor 48 to cathode 38. The inductances 44 and 42 are coupled in a well known manner so as to provide a feed back from the output circuit to the input circuit. The heater filament 39 is connected between the cathode 38 and a suitable tap 49 on the voltage dividing resistor 48. The frequency of this oscillator circuit may be adjusted to any desired value by adjusting the variable condenser 41. It will be understood by those skilled in the art that this is a conventional oscillator circuit and that any convenient oscillator circuit may be used in my control system without departing from the spirit of the invention.

The oscillator circuit 34 is in general similar to the oscillator circuit 33 except that the variable condenser 41 is replaced by three variable condensers 61, 62, and 63 which are connected in series. The variable condenser 61 has a set of stationary plates 64 and a set of movable plates 65 which are biased by a spring 66 so as to move toward the stationary plates 64. A humidity responsive element 67 opposes the biasing spring 66. The element 67 is preferably of the type which decreases in tension upon an increase in humidity. It will therefore be seen that an increase in humidity causes the plates 65 to move closer to the plates 64 thereby increasing the capacitance of condenser 61. Variable condenser 62 is provided with a stationary set of plates 68 and a set of movable plates 69, the latter being positioned relative to the stationary plates by a temperature responsive device 70 shown in the drawing as a bimetallic spiral. This bimetallic spiral is so constructed that an increase in temperature causes the movable plates 69 to move toward the stationary plates 68. It will therefore be apparent that an increase in temperature causes an increase in the capacitance of the condenser 62. Condenser 63 is provided with a set of stationary plates 71 and a set of movable plates 72. The movable plates 72 are eccentrically mounted on a shaft 73 which is connected to the reduction gear mechanism 14.

The oscillator circuit 34 comprises an electric discharge device 75 of any desired type being shown as a triode having an anode 76, a control electrode 77, a cathode 78, and a heater filament 79. The input circuit of triode 75 may be traced from cathode 78 through a conductor 80, an inductance 81, and a coupling condenser 82 to the control electrode 77. The condensers 61, 62, and 63 are also connected in the input circuit through a connection which may be traced from the lower end of the inductance 81 through a conductor 83, condenser 61, a conductor 84, temperature responsive element 70, condenser 62, a conductor 85, condenser 63, and a conductor 86 to the upper end of inductance 81. The output circuit of triode 75 may be traced from anode 76 through an inductance 87, a conductor 88, primary winding 21 of transformer 20, a conductor 89, and a voltage dividing resistor 90 to cathode 78. The heater filament 79 is connected between the cathode 78 and a suitable tap 102 of the voltage dividing resistor 90. The inductance 87 is associated with the inductance 81 so as to provide the necessary feed back from the output circuit to the input circuit of triode 75. An input winding 91 of a phase shifting bridge generally indicated at 92 is connected in parallel with the primary winding 21 of transformer 20. This connection may be traced from the upper end of transformer primary 21 through a conductor 92, input winding 91, conductors 93 and 94 to the right-hand terminal of resistor 90. The phase shifting bridge 92 is of a conventional type having a secondary winding 95 associated with the input winding 91. Connected in series across the terminals of the winding 95 are a resistor 96 and an impedance 97. The output terminals of the phase shifting bridge 92, comprising a tap 98 located centrally of the secondary winding 95 and common terminal 99 of the resistor 96 and impedance 97, are connected through conductors 100 and 101, respectively, to the terminals of primary winding 28 of transformer 27.

The control system is supplied with energy from lines 110 and 111 through a transformer 112 comprising a line voltage primary 113 and a high voltage secondary 114. The terminals of the secondary 114 are connected to the input terminals of a rectifier schematically indicated at 115. The output terminals of rectifier 115 are connected through conductors 116 and 117 to a voltage dividing resistor 118. Resistor 118 is provided with terminals 119 and 120 and intermediate taps 121, 122, and 123. The oscillator circuit 34 is supplied with energy from the resistor 118 through a circuit which may be traced from terminal 119 through conductors 124 and 125, resistor 90, conductors 94, 126, and 127 to tap 121. A filtering condenser 128 is connected between conductors 121 and 124 to prevent the flow of high frequency current in the resistor 118. The oscillator circuit 33 is supplied with energy through a similar circuit which may be traced from tap 121 through conductors 127 and 129, resistor 48, conductors 130, 131, and 132 to tap 122. A filtering condenser 140 is connected between conductors 127 and 132 in order to prevent the flow of high frequency current from the oscillator circuit through resistor 118.

The detector and amplifier 30 is supplied with power through a circuit which may be traced from tap 122 to conductors 132, 131, and 141, detector and amplifier 30, conductors 142, 143, and 144 to tap 123. A filtering condenser 145 is connected between conductors 132 and 144. Detector and amplifier 23 is supplied with power through a circuit which may be traced from tap 123 through conductors 144, 143, and 146, detector and amplifier 23, conductors 147 and 148 to terminal 120. A filtering condenser 149 is connected between conductors 144 and 148.

Operation

In describing the operation of my system, it will first be considered, for the sake of simplification, as though the humidity-responsive condenser 61 were removed, and the only condition-responsive device in the system was the temperature-responsive condenser 62.

The condenser 62 and its bimetallic operating member 70 are located in a room or space whose temperature it was desired to control by means of my system. The valve 10 controls the supply of heating fluid, for example, steam to the room.

When placing my system in operation, the oscillator circuits 33 and 34 are adjusted so that both are operating at the same frequency when the room temperature is at the desired value, and the valve 10 is at some position which would normally tend to maintain the room temperature at that value. This may be done, for example, by disconnecting condenser 63 and valve 10 from each other and from motor 13, so that each may be independently adjusted. The movable plates 72 of condenser 63 are then rotated to a median position by hand. The valve 10 is then controlled manually until the room temperature reaches the desired value. At that time, the oscillator circuit 34 will have a certain frequency, dependent upon the capacitance of condensers 62 and 63, as determined by the room temperature and the condenser position, respectively. This is taken as the standard frequency, and the frequency of oscillator circuit 33 is varied by means of condenser 41, until it is operating at the standard frequency. This condition may be readily determined, since when both oscillators are operating at the same frequency, motor 13 will not be rotated. When this condition has been obtained, the valve 10 and condenser 63 are operatively connected to the motor 13, and the system is then in operation.

The oscillator circuits 33 and 34 operate at relatively high frequencies, for example, several kilocycles, while the motor 13 is of conventional type, and is suitably operated only by currents having a frequency of, for example, less than 100 cycles. The outputs of oscillators 33 and 34 are combined in the transformers 20 and 27, so that the secondary windings 19 and 26 of these transformers carry high frequency current. If the frequencies of oscillators 33 and 34 are different, the secondary windings 19 and 26 also carry a beat frequency current having a frequency equal to the difference between the primary frequencies.

The detector and amplifier circuits 23 and 30 are designed to prevent the passage of high frequency current from the transformers 20 and 27 to the motor windings 16 and 17 while permitting the passage of low frequency current such as would be suitable to operate the motor.

If the frequencies of oscillator circuits 33 and 34 are the same no beat frequency appears in the secondary windings 19 and 26. Therefore no current is produced in the output circuits of the amplifiers 23 and 30 and the motor 13 is not energized. If the temperature of the space being controlled changes, however, from its desired value, a corresponding change takes place in the capacitance of condenser 62, which causes a change in the frequency of oscillator 34. In the transformer 20 there will then be a difference in the frequencies of the currents supplied to the primary windings. As a result, the secondary winding 19 will carry currents of both primary frequencies and in addition a current of beat frequency, which is equal to the difference between the primary frequencies. The detector and amplifier 23 will pass only the current of the beat frequency to the motor winding 16. At the same time, in the transformer 27 currents of the same two primary frequencies will be applied to the primary windings 26 and 28. Because of the action of the phase shifting bridge 92, however, the current supplied to winding 28 will differ in phase approximately 90° from the current supplied to the primary winding 21 of transformer 20. There will be produced in the secondary winding 26 high frequency currents of both the applied frequencies and another current of their beat frequency. This beat frequency current will be of the same frequency as the beat frequency current in secondary winding 19 of transformer 20. Because of the difference in phase of the currents in primaries 21 and 28, however, the beat frequency current in winding 26 will differ in phase by approximately 90° from that in winding 19. The beat frequency current in winding 26 will be amplified in the amplifier 30 and applied to the terminals of motor winding 17. The motor 13 will then have supplied to its windings currents of equal frequency but differing in phase by 90°.

It will be understood by those skilled in the art that these are the proper conditions to produce rotation of a split phase motor of the type described, and that the speed of rotation of the motor 13 will be dependent on the frequency of the current supplied to it. Therefore, it will be seen that the motor 13 will be driven at a speed corresponding to the magnitude of the departure of the effective temperature of the room or space being controlled from its desired value. A large change in temperature will produce a rapid rotation of the motor 13 whereas a small change will produce a smaller rotation. Motor 13, in addition to operating the valve 10 to vary the supply of heating fluid to the room or space under control operates, through the shaft 73, the variable condenser 63. When a change occurs in the temperature of the room under control a rotation of the motor 13 takes place as described above. The direction of rotation of this motor is such as to vary the capacitance of condenser 71 in the opposite sense to that in which the capacitance of condenser 62 was varied by the temperature change. It will be seen therefore that a reduction in temperature of the space under control will cause rotation of the motor 13 until the frequency of the oscillator circuit 34 is restored to its original value by the balancing action of the variable condenser 63. During this rotation the valve 10 will be opened by a certain definite amount depending upon the magnitude of the variation in temperature. For any given temperature of the space under control therefore this system provides an accurate positioning of the valve 10.

The change in frequency produced in the oscillator circuit 34 by a decrease in temperature of the room will be opposite in sense to that produced by an increase in temperature of the room. For example, if an increase in temperature of 2° causes an increase in frequency of 25 cycles, a decrease in temperature of 2° will cause a decrease in frequency of 25 cycles.

When a current of variable frequency is combined with a current of constant frequency to produce a beat frequency, a difference in phase of 180° will be observed between the beat frequency produced when the variable frequency is higher than the standard frequency, and the beat frequency produced when the variable frequency is lower than the standard. As a result of this phenomenon the current in the winding 16 will lead the current in winding 17 by about 90°. When the condition to which the condenser 62 is responsive is displaced in one direction from its established datum while the current in the winding 17 will lead that in the winding 16 when the condition is displaced in the opposite direction. Consequently the direction of rotation of the motor 13 will be determined by the sense of change of the condition to which condenser 62 is responsive. It will be seen therefore that this system will operate the variable condenser 62 in the proper sense to rebalance the system and will operate the valve 10 in the proper direction to provide the necessary change in heating of the space under control.

When the humidity responsive device 67 and its associated condenser 61 are used in my control system, the system is responsive to effective temperature, and the valve 10 may be utilized to control the flow of cooling fluid to the space under control. For correct operation in such a system, the sense of operation of either temperature-responsive member 70, or valve 10 must be reversed from that previously described, so that the valve will open upon a rise in temperature, and close when the temperature falls. When so connected, the valve 10 is operated in accordance with the resultant of two conditions, temperature and humidity. If it is found desirable to determine the resultant directly rather than reciprocally, the condition-responsive condensers in the input circuit of oscillator 34 may be connected in parallel instead of in series.

It will be seen from the foregoing description, that my system is very sensitive to changes in the controlling condition, and that a very small force may be utilized by my system to produce a movement of a control device.

While my invention is particularly applicable to temperature and humidity-responsive systems because of these characteristics, it should be apparent to those skilled in the art that my system may be controlled by any condition which is adaptable to vary a reactance, and that it may operate any device which is adaptable to be driven by a suitable motor. For example, the motor of my device might be used to control the position of a recording pen in many commercial recording devices, or to control the governor of a prime mover.

It will also be apparent to those skilled in the art that the rebalancing condenser 63 of my device could be omitted, and the line 85 connected directly to the line 86. The system would then operate as a two-position control system. That is to say, upon an unbalance of the oscillator outputs in response to a change in the controlling condition, the motor 13 would run to the end of its travel in a direction such as to operate the control means to restore a balance of the controlling condition. The controlling condition would consequently be changed in the opposite sense, and would eventually cause the oscillator outputs to become unbalanced in the opposite sense, and the motor would run to the end of its travel in the opposite direction. The control means would therefore be driven between two extreme positions. Stop means would, of course, be provided to limit the travel of the motor, which might be of the type which is designed to avoid overheating when energized continuously, but prevented from rotating.

While I have described a specific embodiment of my invention it should be understood that the invention is in no sense limited thereto except as set forth in the appended claims.

I claim as my invention:

1. A system for operating a control device, comprising in combination, a source of alternating electrical current of substantially constant frequency, a second source of alternating electrical current, means for varying the frequency of said second source in response to the magnitude of a condition indicative of the need for operation of said control device, means for splitting the output current of one of said sources into two components displaced in phase, a first coupling means for combining one of said components with the output current of the other source so as to produce a first beat frequency current, a second coupling means for combining the other of said components with the output current of the other source so as to produce a second beat frequency current displaced in phase from said first beat frequency current, a motor for driving said control device having a two phase winding, and connections between said first and second coupling means and said winding for supplying said motor with two phase beat frequency current.

2. A system for operating a control device in proportion to the magnitude of departure of a condition from a predetermined value, including in combination, a first source of alternating electrical current of a substantially constant standard frequency, a second source of alternating electrical current normally operating at said standard frequency, means for varying the frequency of said second source in proportion to the magnitude of departure from a predetermined value of a condition indicative of the need for operation of said control device, means for splitting the output current of one of said sources into two components displaced in phase, a first coupling means for combining one of said components with the output current of the other source so as to produce a first beat frequency current, a second coupling means for combining the other of said components with the output current of the other source so as to produce a second beat frequency current displaced in phase from said first beat frequency current, a motor for driving said control device having a two phase winding, connections between said first and second coupling means and said winding for supplying said motor with two phase beat frequency current, and means driven by said motor and associated with said second source for restoring it to its normal operating frequency.

3. A system for operating a control device in proportion to the magnitude of departure of a condition from a predetermined value, including in combination, a first source of alternating electrical current of a substantially constant standard frequency, a second source of alternating electrical current normally operating at said standard frequency, a first reactance means variable in proportion to the magnitude of departure from a predetermined value of a condition indicative of the need for operation of said control device and associated with said second source for regulating the frequency thereof, means for splitting the output current of said one of said sources into two components displaced in phase, a first coupling means for combining one of said components with the output current of the other source so as to produce a first beat frequency current, a second coupling means for combining the other of said components with the output current of the other source so as to produce a second beat frequency current displaced in phase from said first beat frequency current, a motor for driving said control device having a two phase winding, connections between said first and second coupling means and said winding for supplying said motor with two phase beat frequency current, and a second reactance means variable by operation of said motor in a sense opposite to the variation of said first reactance, and associated with said second source for restoring it to its normal operating frequency.

4. A system for operating a control device, comprising in combination, a source of alternating electrical current of substantially constant frequency, a second source of alternating electrical current, means for varying the frequency of said second source in response to the magnitude of a condition indicative of the need for operation of said control device, coupling means for combining the currents from said sources so as to produce a beat frequency current, a motor for driving said control device, a connection between said coupling means and said motor for supplying said motor with said beat frequency current, and a second means for varying the frequency of said second source, said second means being operated by said motor in a sense opposite to said first mentioned means.

5. A system for operating a control device in accordance with the effective temperature of a space, including in combination, a source of alternating electrical current of substantially constant frequency, a second source of alternating electrical current, a first means for varying the frequency of said second source in response to the humidity of said space, a second means for varying the frequency of said second source in response to the temperature of said space, coupling means for combining the currents from said sources so as to produce a beat frequency current, a motor for driving said control device, a connection between said coupling means and said motor for supplying said motor with said beat frequency current, and a third means for varying the frequency of said second source, said third means being operated by said motor to vary the frequency in a sense opposite to that of the variation produced by said first and second means.

6. A system for operating a control device, including in combination, a first source of alternating electrical current of a substantially constant standard frequency, a second source of alternating electrical current normally operating at said standard frequency, means for producing a variation in the frequency of said second source corresponding in magnitude and sense to the variation from a predetermined value of a condition indicative of the need for operation of said control device, means for splitting the output current of one of said sources into two components displaced in phase, coupling means for combining said components with the output current of said other source so as to produce a two phase beat frequency current corresponding in frequency to the magnitude of said condition variation and in phase relations to the sense of said condition variation, and a connection between said coupling means and said control device for supplying the latter with said beat frequency current, said control device operating with a speed proportional to said beat frequency and with a direction determined by said phase relations.

7. A system for operating a control device, including in combination, a first source of alternating electrical current of a substantially constant standard frequency, a second source of alternating electrical current normally operating at said standard frequency, means for producing a variation in the frequency of said second source corresponding in magnitude and sense to the variation from a predetermined value of a condition indicative of the need for operation of said control device, means for splitting the output current of one of said sources into two components displaced in phase, coupling means for combining said components with the output current of said other source so as to produce a two phase beat frequency current corresponding in frequency to the magnitude of said condition variation and in phase relations to the sense of said condition variation, a connection between said coupling means and said control device for supplying the latter with said beat frequency current, said control device operating with a speed proportional to said beat frequency, and with a direction determined by said phase relations, and means operated in unison with said control device and associated with said second source for restoring it to its normal operating frequency.

8. A system for operating a control device, comprising in combination, an electronic oscillator of substantially constant frequency, a second electronic oscillator, impedance means variable in accordance with the magnitude of a condition indicative of the need for operation of said control device and connected to said second oscillator so as to control its frequency, means for splitting the output current of one of said oscillators into two components displaced in phase, a first coupling means for combining one of said components with the output current of the other oscillator so as to produce a first beat frequency current, a second coupling means for combining the other of said components with the output current of the other oscillator so as to produce a second beat frequency current displaced in phase from said first beat frequency current, a motor for driving said control device having a two phase winding, and connections between said first and second coupling means and said winding for supplying said motor with two phase beat frequency current.

9. In combination, a control device, an alternating current motor for operating said control device, said motor having two windings displaced in space phase and characteristics of speed and direction of operation variable in accordance with the frequency and phase relations of the alternating currents supplied to said windings, means responsive to a condition indicative of the need for operation of said control device, variable impedance means operated by said condition responsive means, a source of electrical energy, connections between said source and said motor windings, and means in said connections including said variable impedance means for controlling the frequency and phase relations of the alternating currents supplied to said motor windings in accordance with the magnitude and direction of departure of said condition from a predetermined value.

10. In combination, a control device, an alternating current motor for operating said control device, said motor having two windings displaced in space phase and characteristics of speed and direction of operation variable in accordance with the frequency and phase relations of the alternating currents supplied to said windings, means for supplying alternating electrical currents to said windings, and means responsive to a condition indicative of the need for operation of said control device for controlling the frequency and phase relations of said alternating currents in accordance with the magnitude and direction of departure of said condition from a predetermined value.

11. A system for operating a control device in accordance with the temperature of a space, including in combination, a source of alternating electrical current of substantially constant frequency, a second source of alternating electrical current, means for varying the frequency of said second source in accordance with the temperature of said space, means for splitting the output current of one of said sources into two components displaced in phase, a first coupling means for combining one of said components with the output current of the other source so as to produce a first beat frequency current, a second coupling means for combining the other of said components with the output current of the other source so as to produce a second beat frequency current displaced in phase from said first beat frequency current, a motor for driving said control device having a two phase winding, and connections between said first and second coupling means and said winding for supplying said motor with two phase beat frequency current.

12. In combination, a control device, an alternating current motor for operating said control device, said motor having a speed characteristic variable in accordance with the frequency of electrical energy supplied thereto, a source of electrical energy, means for transmitting electrical energy between said source and said motor, means responsive to a condition indicative of the need for operation of said control device for controlling the frequency of the energy transmitted to said motor in accordance with the magnitude of the variation of said condition from a predetermined value, and means driven by said motor concurrently with said control device for varying the frequency of said energy in a sense opposite to that of said condition responsive means, so as to terminate operation of said motor after said control device has moved an amount dependent upon the magnitude of the variation of said condition.

ALWIN B. NEWTON.